United States Patent [19]

Duncan et al.

[11] Patent Number: 4,896,488
[45] Date of Patent: Jan. 30, 1990

[54] TRIMMING ATTACHMENT FOR A LAWN MOWER ETC.

[76] Inventors: Larry A. Duncan, 1343 Sophie Blvd., Orlando, Fla. 32828; George Spector, 233 Broadway, Rm. 3815, New York, N.Y. 10007

[21] Appl. No.: 291,575

[22] Filed: Dec. 29, 1988

[51] Int. Cl.⁴ ............................................. A01D 50/02
[52] U.S. Cl. ...................................... 56/13.7; 56/16.9
[58] Field of Search ........................ 56/11.6, 12.7, 13.7, 56/16.9, 233, 255, 256; 280/767

[56] References Cited

U.S. PATENT DOCUMENTS

| | | | |
|---|---|---|---|
| 3,531,922 | 10/1970 | Hansen | 56/13.7 |
| 3,668,845 | 6/1972 | Parker | 56/11.6 |
| 3,782,085 | 1/1974 | Parker et al. | 56/256 |
| 4,170,099 | 10/1979 | Owens | 56/12.7 |
| 4,642,976 | 2/1987 | Owens | 56/16.9 |
| 4,718,221 | 1/1988 | Wessel et al. | 56/256 |

*Primary Examiner*—William P. Neuder
*Assistant Examiner*—Terry Lee Melius

[57] ABSTRACT

A grass trimming attachment for a power lawn mower is provided that is mounted to extend from one side of the lawn mower and driven by the engine. The attachment can be pivoted upwardly and held against the lawn mower out of its normal operating position.

3 Claims, 1 Drawing Sheet

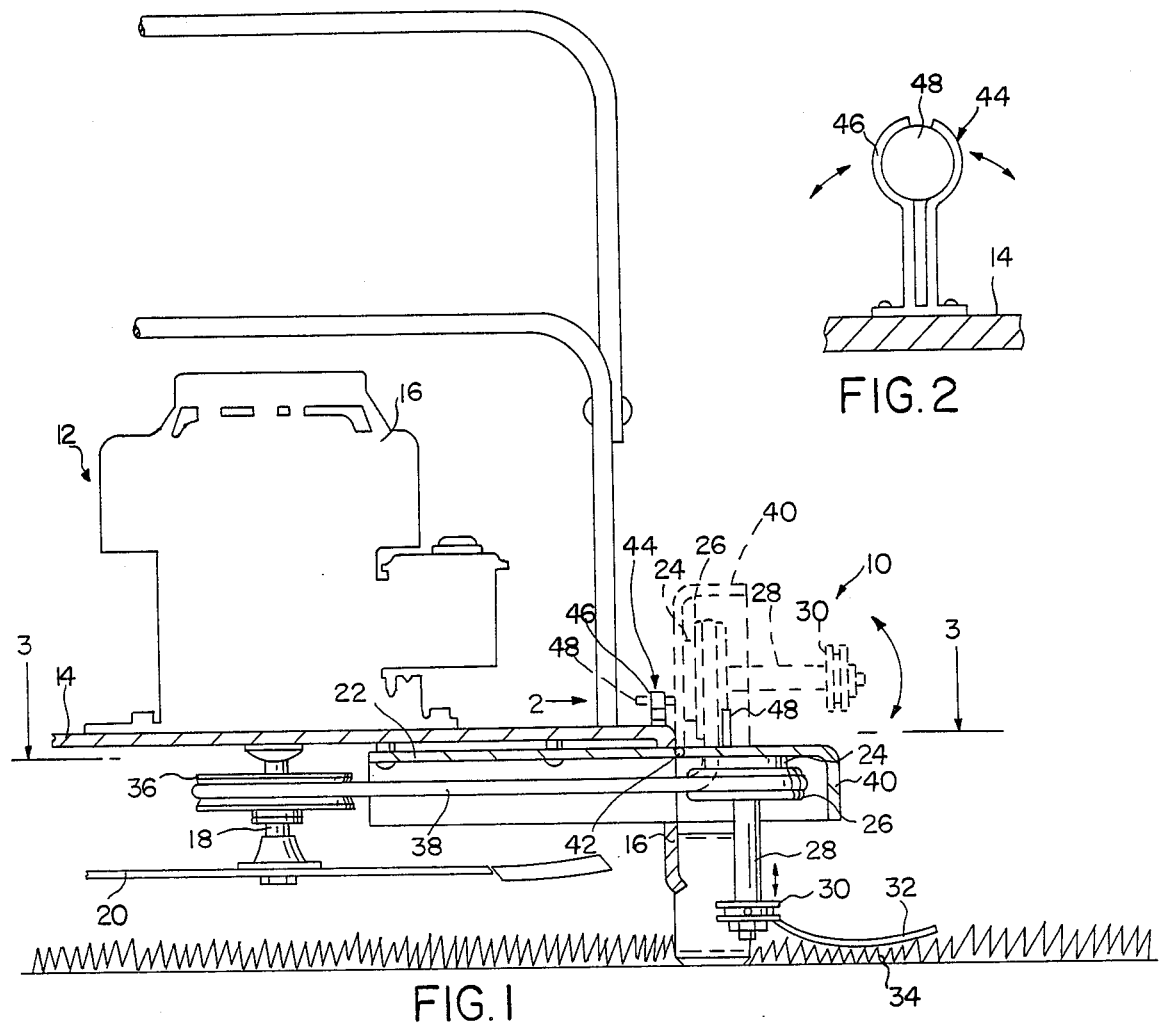
FIG. 2
FIG. 1
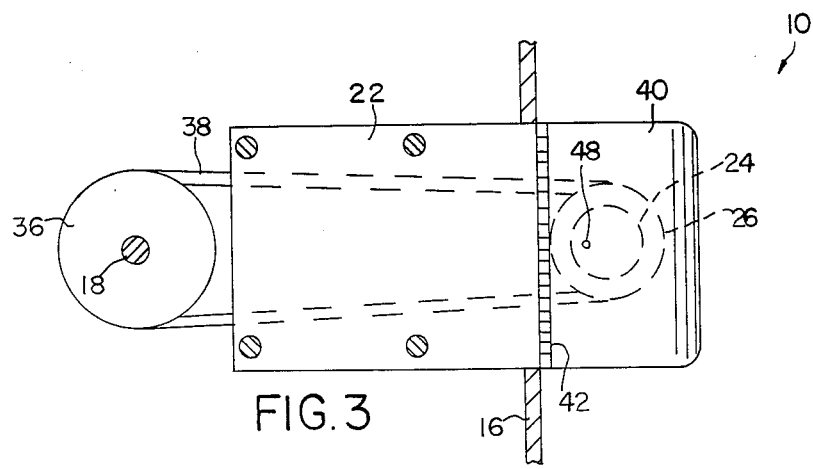
FIG. 3

TRIMMING ATTACHMENT FOR A LAWN MOWER ETC.

BACKGROUND OF THE INVENTION

The instant invention relates generally to power lawn mowers and more specifically it relates to a grass trimming attachment for a power lawn mower.

Numerous power lawn mowers have been provided in prior art that are adapted to include built in trimmers and edger attachments. For example, U.S. Pat. Nos. 4,170,098; 4,453,372 and 4,642,976 all are illustrative of such prior art. While these units may be suitable for the particular purpose to which they address, they would not be as suitable for the purposes of the present invention as heretofore described.

SUMMARY OF THE INVENTION

A primary object of the present invention is to provide a grass trimming attachment that will overcome the shortcomings of the prior art devices.

Another object is to provide a grass trimming attachment for a power lawn mower that is mounted to extend from one side of the lawn mower and driven by the engine.

An additional object is to provide a grass trimming attachment which can be pivoted upwardly and held against the lawn mower out of its normal operating position.

A still further object is to provide a grass trimming attachment that is simple and easy to use.

A still further object is to provide a grass trimming attachment that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is an elevational view partly in section of a portion of a lawn mower with the invention therein.

FIG. 2 is an enlarged end view taken in direction of arrow 3 in FIG. 1 showing the clamp in greater detail.

FIG. 3 is a cross sectional view taken along line 3—3 in FIG. 1 showing the protective casing and flip up cover.

DETAILED DESCRIPTION OF THE PREFERRED EMBODIMENTS

Turning now descriptively to the drawings, in which similar reference characters denote similar elements throughout the several views, FIGS. 1 and 3 illustrate a grass trimming attachment 10 for a power lawn mower 12 that has a housing 14 with a downwardly extending skirt 16, an engine 16 with a drive shaft 18 extending into the housing 14 and supporting cutter blades 20 located within the skirt 16.

The attachment 10 consists of a protective casing 22 mounted to underside of the housing 14 and extends through one side of the skirt 16. A bearing 24 is mounted to underside of the casing 22 extending outside the housing 14. A first pulley 26 is rotatably carried on underside of the bearing 24. A vertical shaft 28 extends from the first pulley 26 below the skirt 16. A trimmer hub 30 is on bottom portion of the pulley shaft 28 while a flail member 32 is connected to the trimmer hub 30 and is operative for trimming grass 34 adjacent to the skirt 16 when the shaft 28 and the hub 30 are rotated. A second pulley 36 is affixed onto the drive shaft 18 of the engine 16. A drive belt 38 extends around the pulleys 26 and 36 so that operation of the engine 16 will cause the first pulley 26, the vertical shaft 28 and the trimmer hub 30 to rotate allowing the flail member 32 to trim the grass 34.

The protective casing 22 has a portion that extends through one side of the skirt 16 which is a protective cover 40 hinged at 42 to rest of the protective casing 22. The protective cover 40 can flip up to disengage the grass trimming attachment 10 out of its normal operating position when the drive belt 38 is removed from the first pulley 26.

As best seen in FIG. 2, a structure 44 is provided for holding the protective cover 40 out of the normal operating position. The structure 44 includes a flexible clamp member 46 mounted to top side of the housing 14. A pin 48 is mounted to top side of the protective cover 40 so that when the protective cover 40 is out of the normal operating position the pin 48 will engage with the flexible clamp member 46 to keep the protective cover 40 stationary thereto. The trimmer hub 30 further includes a set screw 50 so that the trimmer hub 30 can be adjustable with respect to the first pulley shaft 28.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A grass trimming attachment for a power lawn mower having a housing with a downwardly extending skirt, an engine with a drive shaft extending into the housing and supporting cutter blades located within the skirt, said attachment comprising:
    (a) a protective casing mounted to an underside of the housing and extending through one side of the skirt;
    (b) a bearing mounted to an underside of said casing extending outside the housing;
    (c) a first pulley rotatably carried on an underside of said bearing;
    (d) a vertical shaft extending from said first pulley below the skirt;
    (e) a trimmer hub mounted on a bottom portion of said vertical shaft;
    (f) a flail member connected to said trimmer hub, operative for trimming grass adjacent to the skirt when said shaft and said hub are rotated;
    (g) a second pulley affixed onto the drive shaft of the engine;
    (h) a drive belt extending around said pulleys so that operation of said engine will cause said first pulley, said vertical shaft and said trimmer hub to rotate allowing said flail member to trim the grass;
    (i) said protective casing having a portion that extends through one side of the skirt being a protective cover hinged to the rest of said protective casing, so that said protective cover can flip up to disengage said grass trimming attachment out of its normal operation position when said drive belt is removed from said first pulley; and (j) means for holding said protective cover out of the normal operating position.

2. A grass trimming attachment as recited in claim 1, wherein said holding means includes:

(a) a flexible clamp member mounted to a top side of the housing; and (b) a pin mounted to a top side of said protective cover so that when said protective cover is out of the normal operating position said pin will engage with said flexible clamp member to keep said protective cover stationary thereto.

3. A grass trimming attachment as recited in claim 2, wherein said trimmer hub further includes a set screw so that said trimmer hub can be adjustable with respect to said first pulley shaft.

* * * * *